(12) United States Patent
Toda et al.

(10) Patent No.: US 7,389,188 B2
(45) Date of Patent: Jun. 17, 2008

(54) FLUID-STRUCTURE COUPLED NUMERICAL SIMULATION METHOD AND PROGRAM FOR FLUID-STRUCTURE COUPLED NUMERICAL SIMULATION STORAGE DEVICE

(75) Inventors: Akira Toda, Kanagawa (JP); Tatsushiro Hirata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/548,363

(22) Filed: Oct. 11, 2006

(65) Prior Publication Data

US 2007/0129919 A1 Jun. 7, 2007

(30) Foreign Application Priority Data

Oct. 26, 2005 (JP) .......................... P2005-311680

(51) Int. Cl.
*G01F 17/00* (2006.01)
*G01F 23/00* (2006.01)
(52) U.S. Cl. ............................ 702/50; 73/434; 73/445; 73/452; 73/37; 73/53.04
(58) Field of Classification Search ................. 702/50; 73/434, 445, 452, 37, 53.04
See application file for complete search history.

(56) References Cited

FOREIGN PATENT DOCUMENTS

| JP | 2000-271734 | * | 3/2000 |
|---|---|---|---|
| JP | 2000-271734 | | 10/2000 |
| JP | 2002-245097 | | 8/2002 |

* cited by examiner

*Primary Examiner*—John Barlow
*Assistant Examiner*—Sujoy Kundu
(74) *Attorney, Agent, or Firm*—Sonnenschein Nath & Rosenthal LLP (57) ABSTRACT

A fluid-structure coupled numerical simulation method is provided. The method uses a finite volume method employing an orthogonal mesh and a computer and memory setting a solid area based on a solid rate inside a mesh and at a tangent position to each mesh, including the steps of: setting initial and boundary conditions of a moving film structure; setting a velocity boundary in the tangent direction of the film structure by computing a position and shape thereof; and computing a curvature thereof. The method further includes the step of computing a pressure balance based on a balance between a pressure obtained from a fluid computation and a repulsive force obtained from the tension and curvature of the film structure to implement processing of a mutually-coupled phenomenon. A shift amount of the film surface for each time of said computing steps is simulated using the same program.

17 Claims, 6 Drawing Sheets

Prior Art

FIG. 1

Prior Art

FLUID-STRUCTURE COUPLED NUMERICAL SIMULATION METHOD AND PROGRAM FOR FLUID-STRUCTURE COUPLED NUMERICAL SIMULATION STORAGE DEVICE

CROSS REFERENCES TO RELATED APPLICATIONS

The present invention contains subject manner related to Japanese Patent Application JP 2005-311680 filed in the Japanese Patent Office on Oct. 26, 2005, the entire contents of which being incorporated herein by reference.

BACKGROUND OF THE INVENTION

1. Field of the Invention

The present invention relates to a fluid-structure coupled numerical simulation method and a program for a fluid-structure coupled numerical simulation storage device. Particularly, the present invention relates to the aforementioned method and program, in which when applying a fluid to a film structure, assuming that a film surface is a surface of a fixed area in a computational mesh, a fluid analysis is executed in the same solver with respect to the relationship between a repulsive force of the film surface of the film structure and a fluid pressure.

2. Description of the Related Art

In the past, when simulating physical action of a design model, for example, conducting a thermal conductivity analysis, fluid analysis, structural analysis, electromagnetic field analysis, electromagnetic wave analysis and the like by a computer to verify the design model, a coupled analysis in which two or more kinds of simulation are applied is performed on an object model, corresponding to the object model for analysis being complicated.

In such coupled analysis, it is necessary to set a plurality of physical parameters for element groups if two or more physical models are provided, and so work of setting becomes complicated when one-dimensional list is used. Further, when boundary conditions are set, it is necessary to perform the setting while considering a setting condition for each of the element groups, that is, which boundary corresponds to which physical model, thereby bringing the complexity to the work. Japanese Patent Application Publication No. 2002-245097 discloses a coupled analysis method of easily setting conditions on element groups and boundaries regarding an object model, a method of setting the analysis conditions, a storage device and program in a coupled analysis system using two or more physical models.

Figure 1:
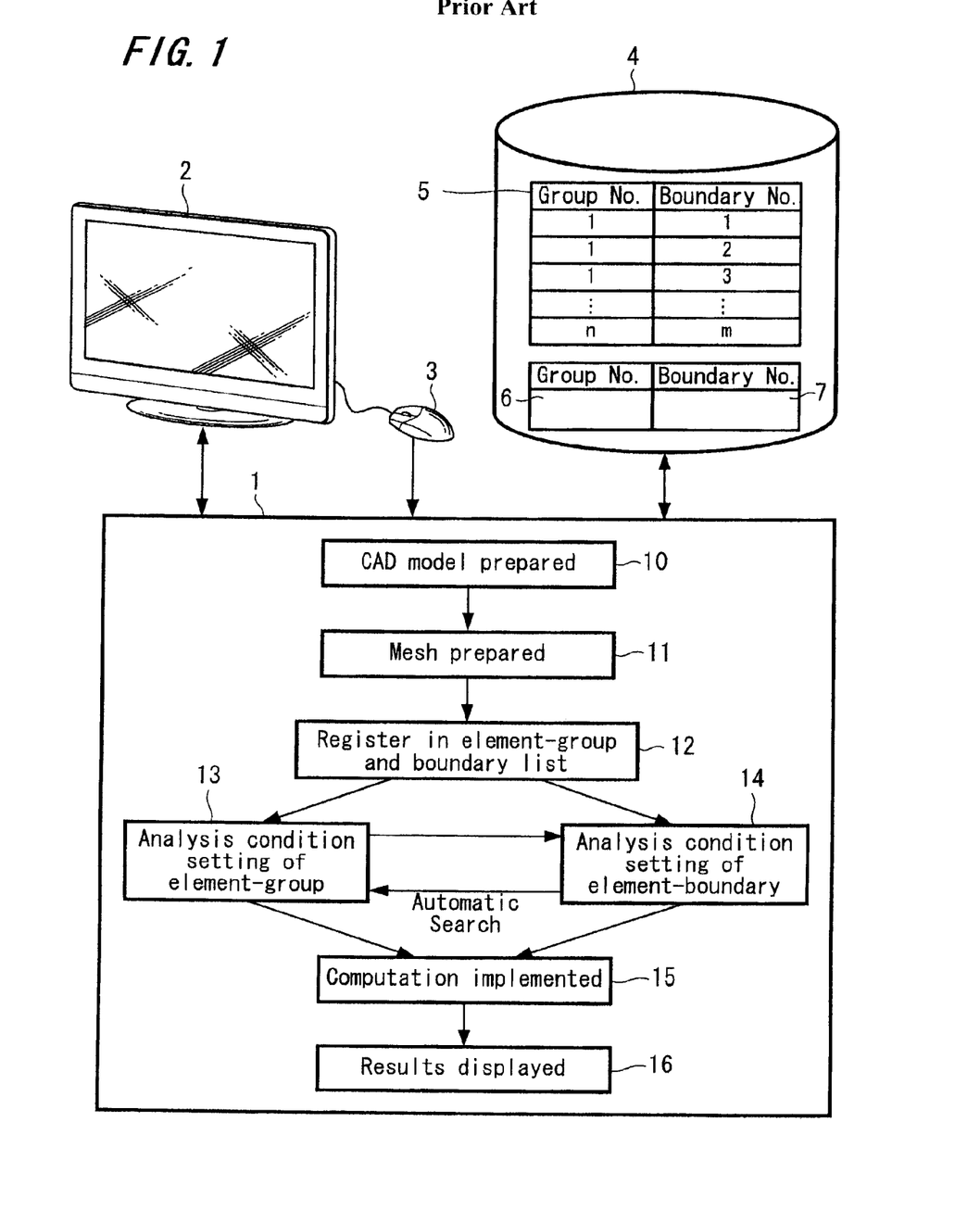
FIG. 1 is a configuration diagram showing a coupled analysis system of related art.

FIG. 1 shows the coupled analysis system disclosed in the above-mentioned patent reference configured to have a CPU (Central Processing Unit) 1, display 2, input device 3 such as a mouse and filing device (storage device) 4. The CPU 1 implements CAD model preparation processing 10 by which a model to which a numerical simulation is implemented is prepared. The prepared model is divided into mesh (elements), and at this time, mesh preparation processing 11 that defines a group and boundary of each mesh is implemented. Groups are registered in a group list 6, boundaries are registered in a boundary list 7, and the corresponding relations between groups and boundaries are registered in a corresponding list 5. As shown in FIG. 1, the corresponding list 5 is provided in the filing device 4. List-registration processing 12 that stores group numbers and corresponding boundary numbers is performed, and analysis conditions with respect to the groups and boundaries of the meshes (elements) divided are set by element group analysis-condition-setting processing 13 and element boundary analysis-condition-setting processing 14. For example, thermal conductivity is set to the element groups and a temperature and thermal conductivity are set to the boundaries in the thermal conductivity analysis. Further, a young's modulus or the like is set to the element groups and a weight condition or the like is set to the boundaries in the structural analysis. Both the analysis-condition-setting processings 13 and 14 are linked mutually.

Subsequently, physical-model simulation/computation processing 15 and computed-result display processing 16 are implemented. Here, computation is implemented in the computation processing 15 using the model divided into mesh and analysis conditions, thereby obtaining a solution. A general-purpose thermal analysis program, structural analysis program and fluid analysis program are used in the computation processing 15. The result display processing 16 is performed such that the computed result obtained by the computation processing is output to a screen of a display 2. As described above, the CPU performs such steps 10 and 11 of setting physical models of the element groups constituting the object model, and step 12 of retrieving boundaries of the object model corresponding to the element groups that were set. Further, the CPU performs a step 13 of reflecting the physical models of the element groups to the retrieved boundaries on analysis-condition-setting screen for the boundaries of the object model, and a step 14 of setting analysis conditions of the boundaries on the analysis-conditions-setting screen for the boundaries reflected. By using a principle of a specific group and the boundary thereof having a common physical-model characteristic, correlation between the group and boundary is reflected on a boundary condition setting screen, and the physical model of the group is set to automatically retrieve the boundary corresponding to the group, and the analysis conditions of the boundary are set on the boundary condition-setting screen.

As described above, the technology described in Japanese Patent Application Publication No. 2002-245097 includes the function of displaying a two-dimensional list of the physical models (thermal conductivity, fluid, structural analysis, static electromagnetic field and electromagnetic field) and names of the boundaries. Therefore, referencing the corresponding list 5 in the filing device 4, a situation in which the physical model of each element group is assigned is displayed on the boundary list and boundaries to which the conditions-setting in the boundaries list are needed are automatically checked. For example, a checked result is displayed with a circle or the like, and so the setting of the boundary condition of the physical model to which each boundary corresponds can be performed by clicking (or double clicking) an area of the boundary name checked. Accordingly, since the two-dimensional list is prepared as described above, the setting of physical parameters to the element groups becomes easy in an achievement analysis having a plurality of physical models. Further, situations of the physical parameters set to the element groups are determined, the boundary condition to which setting is needed is automatically checked, and can be set in the boundary list, thereby the setting of boundary conditions being facilitated. Furthermore, the element group list, boundary list and shapes of models can be output simultaneously, thus facilitating understanding of the setting conditions for analysis.

Japanese Patent Application Publication No. 2000-271734 discloses a fluid-solidification analysis method to which computer simulation is applied. This method is to find an optimal method and optimal condition for producing a high quality product without casting defects such as a flow defect caused by the decrease in temperature in a molten metal flow, in the case where metal melt material is used as fluid to form cast or die-cast products.

The state of molten metal solidified is modeled with a solid-phase rate which shows a rate of the solid phase existing in the liquid phase based on the temperature of each minute element. The molten metal is treated as Newtonian fluid in the state of the solid-phase rate of 0% at a temperature higher than the liquidous line temperature, is treated as non-Newtonian fluid in the solid-liquid co-existent area at a temperature higher than the solidus line temperature and lower than the liquidous line temperature, and is treated as the obstacle not fluid in the state of the solid-phase rate of 100% at a temperature lower than the solidus line temperature. Thus, an optimum flow-field analysis method is applied to each solidified state, enabling an analysis result with high accuracy for the process to be practically obtained in a short period of time.

Figure 2:
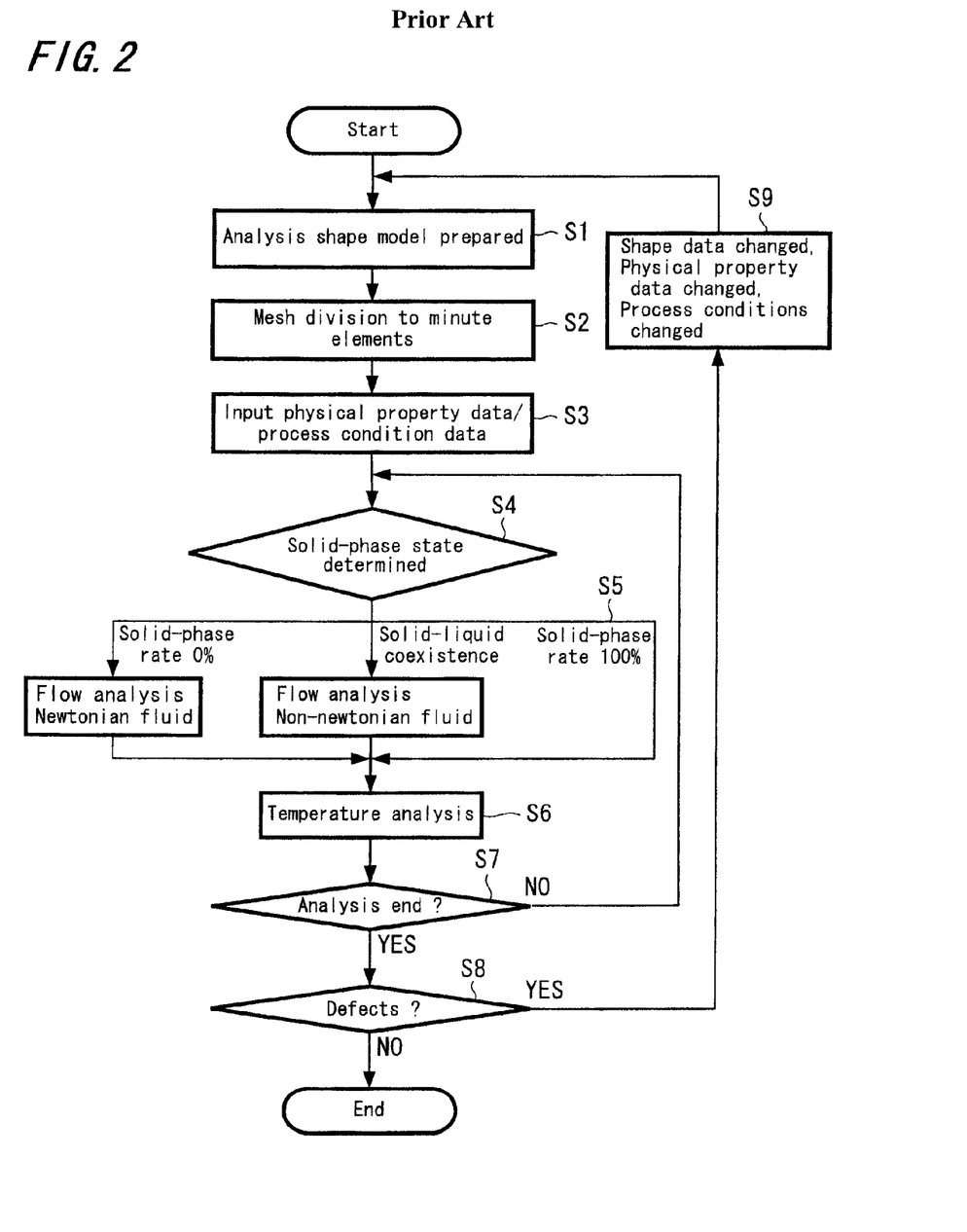
FIG. 2 is a flow chart of a fluid-solidification analysis method of related art.

FIG. 2 shows a flow chart of the fluid-solidification analysis method to which the computer simulation described in the above-described patent reference is applied. In order to implement the fluid-solidification analysis of molten metal inside a mold, a shape model is prepared based on a molded product by injection molding and the mold used for the injection molding in step S1. An analysis shape model divided into minute elements is prepared using mesh in step S2. The analysis model is suitable for a difference method, finite element method, boundary element method, FAN method, control volume method and the like that are fluid-solidification analysis methods.

In step S3, input condition data such as physical property data, boundary conditions, process conditions and the like necessary for the fluid-solidification analysis after preparing the analysis shape model are determined and input. Hereupon, the input condition data are set for simulating a process that produces a molded product by the numerical analysis with respect to the analysis shape model. Those are conditions necessary for the analysis, such as a inflow velocity of molten metal, inflow temperature and filling time, mold temperature, values of dynamic physical properties and thermal physical properties of the mold, values of dynamic physical properties and thermal physical properties of the molten material, boundary conditions (such as thermal boundary condition) and the like.

In the next step S4, a process in which the molten metal is filled inside the mold is simulated using a numerical analysis method on the basis of the given input condition data. When implementing the analysis, the solidified state of molten metal in each minute element is modeled using the solid-phase rate that shows a rate of solid phase existing in the liquid phase from the temperature of each minute element, and a state of the molten metal is determined. Specifically, as shown in step S5, the state of the molten metal, which is the complete liquid-phase state, solid-liquid co-existing state or complete solid-phase state, is determined from the temperature of the molten metal. The complete liquid-phase state is the range at a temperature higher than the liquidous line temperature and the solid-phase rate is 0%. The solid-liquid co-existent state is the range at a temperature higher than solidus line temperature and lower than liquidous line temperature. The complete solid-phase state is the range at the temperature lower than solidus line temperature and the solid-phase rate is 100%.

After the state is determined, an optimal flow-field analysis method is applied to each solidified state based on the state determined, and the simulation is implemented using the numerical analysis method to conduct a flow analysis. The flow analysis employing the numerical analysis method is implemented at predetermined time intervals in accordance with the input condition data and the solid-phase rate. Here, the predetermined time interval is an interval in the range of about 0.001 to 0.01 sec. When implementing the flow analysis to the state in which the molten metal in each minute element is in the solid-phase rate of 0% at the temperature higher than the liquidous line temperature, the flow analysis is implemented regarding the molten metal as Newtonian fluid. Further, in the state in which the molten metal in each minute element is in the solid-liquid coexistent range at the temperature higher than the solidus line temperature and lower than the liquidous line temperature, the flow analysis is implemented regarding the molten metal as non-Newtonian fluid. Furthermore, in the state in which the molten metal in each minute element is in the solid-phase rate of 100% at the temperature lower than the solidus line temperature, the molten metal is treated as the obstacle instead of fluid and the flow analysis is not implemented.

After the fluid analysis, in order for the filling state of molten metal in the mold being changed by the result of the fluid analysis to be reflected in temperature distribution, temperature analysis is implemented in step S6 regarding temperature changed situations of the molten metal and mold using the numerical analysis method at predetermined time intervals of about 0.01 to 0.02 sec. After the temperature analysis, whether to continue the analysis is judged from the given input condition data, and in the case of "NO", operation goes back to the step S4, and in the case of "YES", operation proceeds to step S8 to end. Further, positions such as flow defect portions where defects may occur are predicted in step S8 based on the analysis result obtained in step S7 indicating molten metal unfilled portions.

If the occurrence of defects are predicted in step S8, as shown in step S9, at least one of the conditions of the analysis shape model and input condition data is changed and each of process from the step S1 to step S8 is repeated until it is recognized that the occurrence of defects is not predicted. Then, the processing ends when the occurrence of defects is not predicted in the step S8.

As described above, Japanese Patent Application Publication No. 2002-245097 discloses the technology to simplify settings of boundary conditions that become complicated when the structural analysis and fluid analysis are implemented, and Japanese Patent Application Publication No. 2000-271734 discloses the technology to implement the fluid-solidification analysis of molten metal in a mold. Problems in the above-described computational solving method have not sufficiently been solved with a simplified method, and there remains complexity in the computation and modeling when implementing the fluid-structure coupled simulation or the like.

For example, there are provided methods of simulating a fluid-structure coupled processing phenomenon in a process of liquid being applied on a film. In such phenomenon a position or shape of a surface of the film is changed by the behavior of liquid discharged and the liquid flows on this surface, and so the phenomenon progresses while both the behaviors of the film and liquid being closely related to each other. There is proposed, for example, a method in which two solvers for a fluid and structure are provided and computation progresses while exchanging information on pressure distribution and a structure position between the two solbers. Further, there is provided another method in which a coupled Jacobian matrix is prepared using a finite element method, fluid equation or structure equation and the like, and the matrix solution is obtained. Although these methods are accurate, computational load is high and a convergence computation becomes unstable in the case where film is greatly transformed or the film touches another structure.

SUMMARY OF THE INVENTION

In view of the above, it is desirable to provide a fluid-structure coupled numerical simulation method in which a fluid-analysis and a structure-analysis can be implemented in one solver. In this method, a film surface is assumed to be the surface of a solid area in a computational mesh, when simulating a fluid-structure coupled phenomenon in the process of a liquid being applied on the film, in which a position and shape of the film surface are changed by the behavior of the liquid discharged and further the liquid flows on this surface.

It is further desirable to provide a fluid-structure coupled numerical simulation method in which a fluid-analysis and a structure-analysis are implemented in one solver. In this method, a film surface is assumed to be the surface of a solid area in a computational mesh, when simulating a fluid-structure coupled phenomenon in the process of a liquid being applied on the film, in which a position and shape of the film surface are changed by the behavior of the liquid discharged and further the liquid flows on this surface. Further, this method is capable of simulating a shift amount of the film surface of a film-structure in each computational time step from a balance between a pressure obtained from a fluid computation and a repulsion force obtained from a tension and curvature of the film structure by assuming that the film-structure has no rigidity for bend.

It is further desirable to provide a program for a fluid-structure coupled numerical simulation storage device in which a fluid-analysis and a structure-analysis are implemented in one solver. In this program, a film surface is assumed to be the surface of a solid area in a computational mesh, when simulating a fluid-structure coupled phenomenon in the process of a liquid being applied on the film, in which a position and shape of the film surface are changed by the behavior of the liquid discharged and further the liquid flows on this surface. Further, this program is capable of simulating a shift amount of the film surface of a film-structure in each computational time step from a balance between a pressure obtained from a fluid computation and a repulsion force obtained from a tension and curvature of the film structure by assuming that the film-structure has no rigidity for bend.

According to an embodiment of the present invention, there is provided a fluid-structure coupled numerical simulation method using a finite volume method employing an orthogonal mesh and a computer and memory setting a solid area based on a solid rate inside a computational mesh and at a tangent position to each mesh. The fluid-structure coupled numerical simulation method includes the steps of: setting initial and boundary conditions of a shape, shift computed area, tension, feeding velocity and the like of a moving film structure; setting a velocity boundary in the tangent direction of the film structure by computing a position and shape of the film structure; and computing a curvature of the film structure. Further, the method includes the step of computing a pressure balance based on the balance between a pressure obtained from a fluid computation and a repulsive force obtained from the tension of the film structure and curvature thereof computed in the curvature computing step to implement processing of a mutually-coupled phenomenon between the film structure assumed to have no rigidity for bend moving in a predetermined direction and a fluid flowing on a surface of the film structure. In this method, a shift amount of a film surface for each time of the computing steps is simulated using the same program.

According to another embodiment of the present invention, there is provided a program for a fluid-structure coupled numerical simulation storage device, using a finite volume method employing an orthogonal mesh and a computer and memory setting a solid area based on a solid rate inside a computational mesh and at a tangent position to each mesh. The program includes the steps of: setting initial and boundary conditions of a shape, shift computed area, tension, feeding velocity and the like of a moving film structure; setting a velocity boundary in the tangent direction of the film structure by computing a position and shape of the film structure; and computing a curvature of the film structure. Further, the program includes the steps of computing a pressure balance based on a balance between a pressure obtained from a fluid computation and a repulsive force obtained from the tension of the film structure and the curvature thereof computed in the curvature computing step to implement processing of a mutually-coupled phenomenon between the film structure assumed to have no rigidity for bend moving in a predetermined direction and a fluid flowing on a surface of the film structure. In this program, a shift amount of a film surface for each time of the computing steps is simulated using the same program.

According to the embodiments, when a film coating process is considered, stable coating conditions based on a film tension, a fixed roller position, a film feeding velocity, a coating-liquid discharging velocity, a viscosity of coating liquid and a shape of discharge nozzle and the like can be examined on the simulation using a simple procedure. Therefore, a fluid-structure coupled numerical simulation method and a program for a fluid-structure coupled numerical simulation storage device are obtained, with which computation can be implemented with small load, stability and high velocity when implementing the fluid-structure coupled numerical simulation for targeting the behavior of fluid with which a film structure is coated.

BRIEF DESCRIPTION OF THE DRAWINGS

FIGS. 7A and 7B are explanatory views showing divided mesh, in which

DESCRIPTION OF THE PREFERRED EMBODIMENTS

Figure 3:
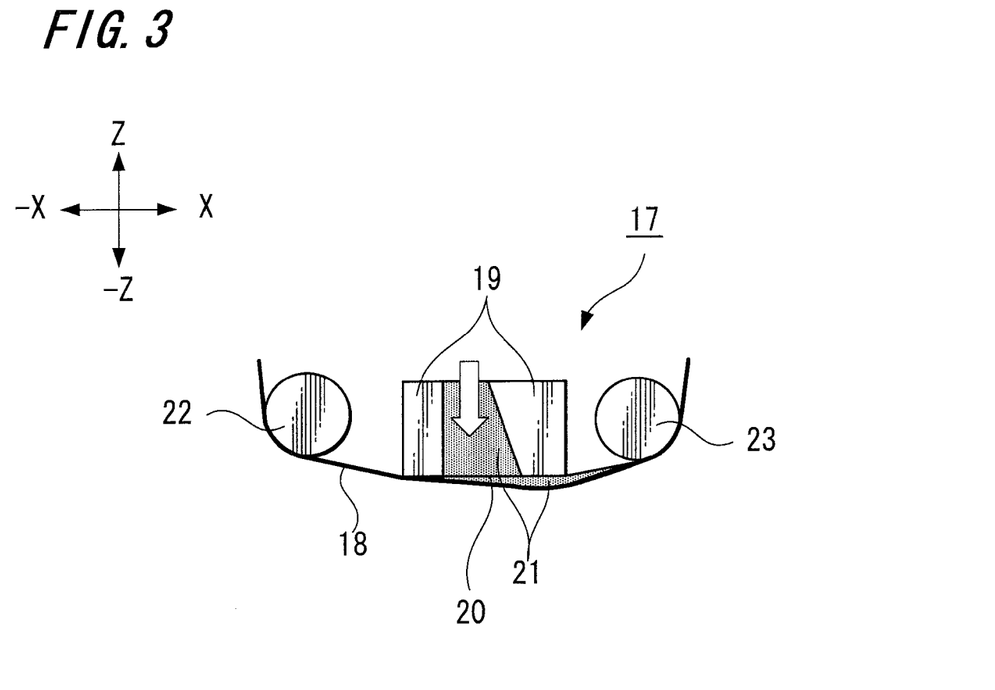
FIG. 3 is a schematic view of a running path of a coating device, showing a fluid-structure coupled numerical simulation method according to an embodiment of the present invention.
Figure 4:
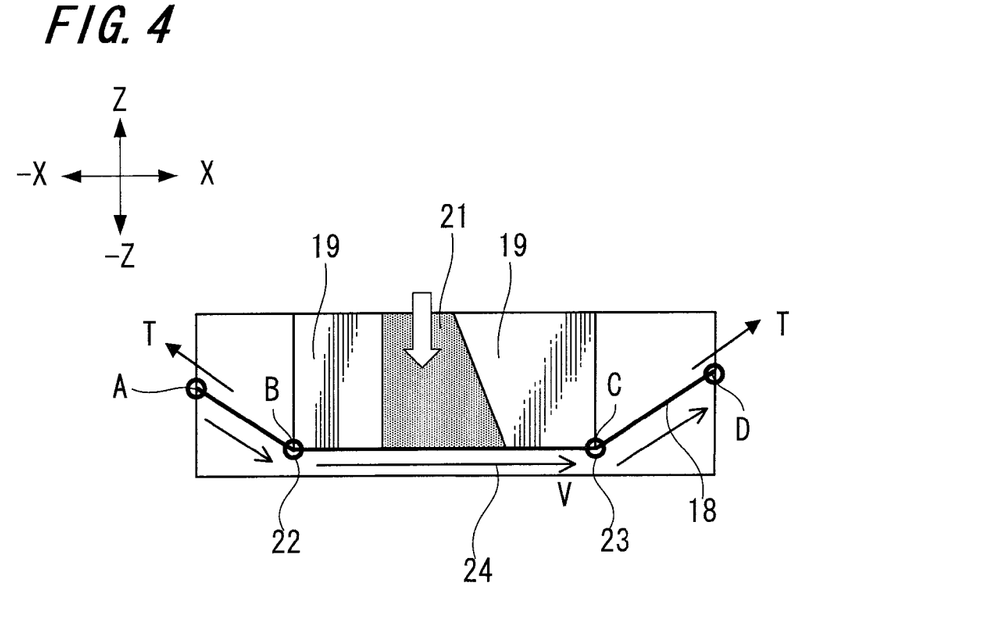
FIG. 4 is a view showing a computational model of the coating device shown in FIG. 3.
Figure 5:
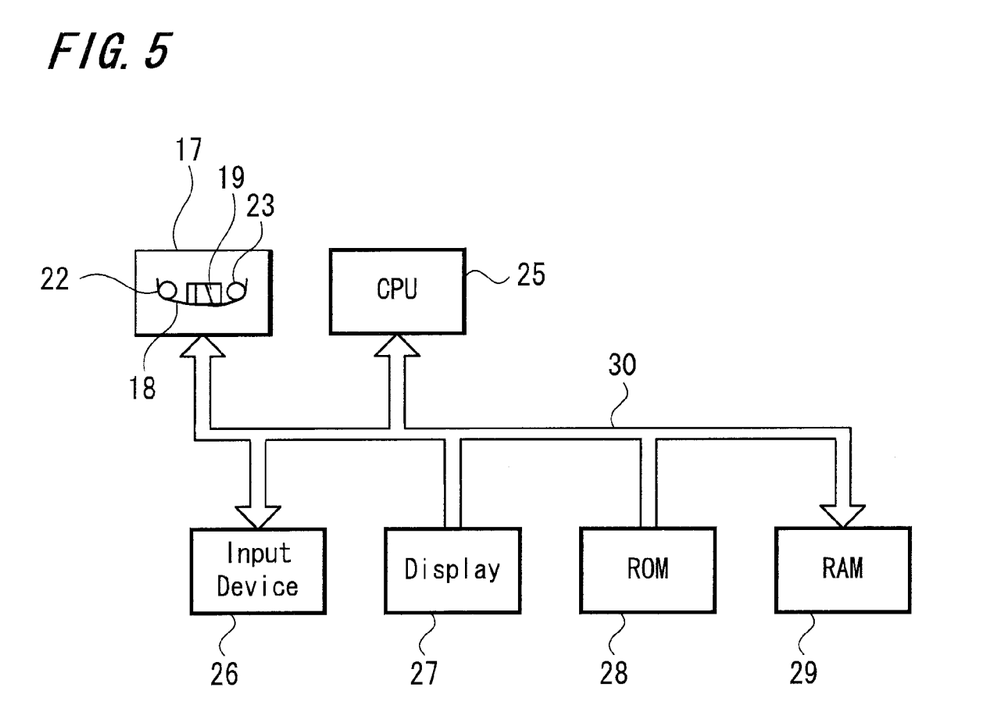
FIG. 5 is a system diagram showing a computer and memories that implement the fluid-structure coupled numerical simulation according to an embodiment of the present invention.
Figure 6:
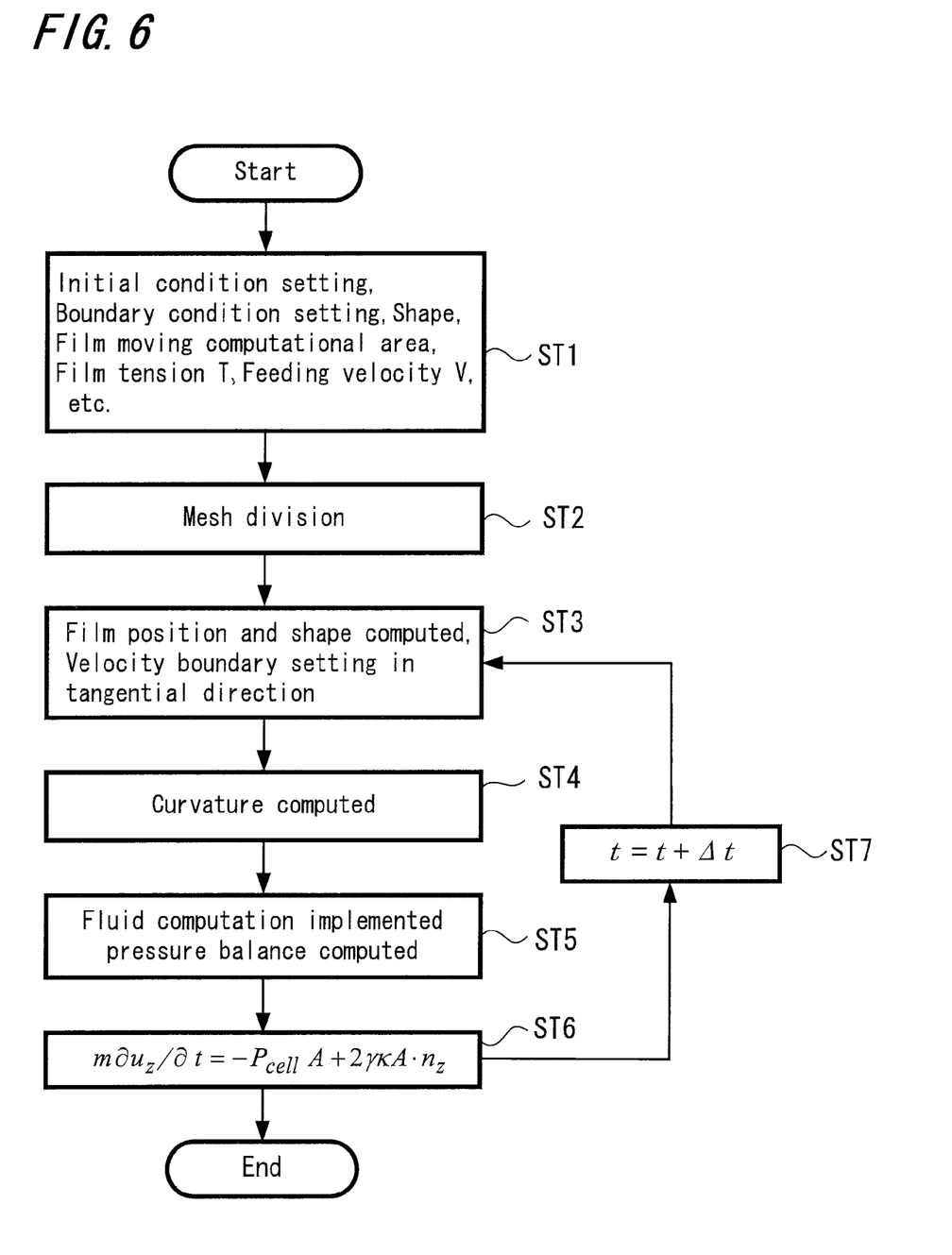
FIG. 6 is a flow chart showing a fluid-structure coupled numerical simulation method according to an embodiment of the present invention.
Figure 7A:
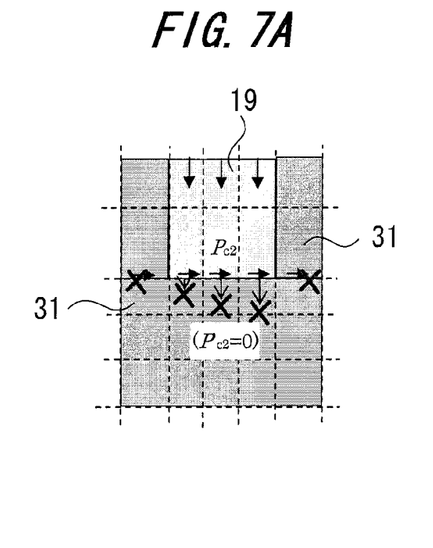
FIG. 7A shows the divided mesh at the start of computation in a fluid-structure coupled numerical simulation method according to an embodiment of the present invention.
Figure 7B:
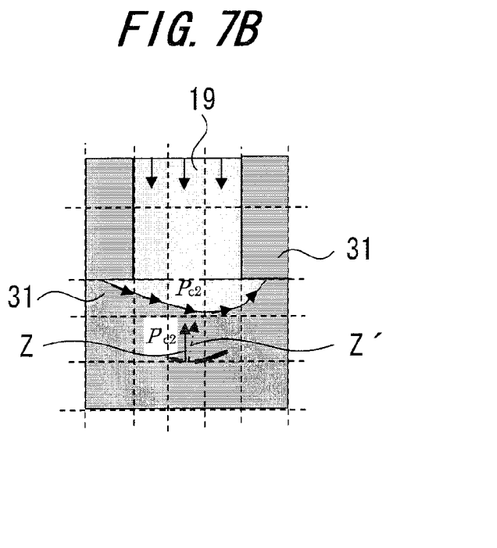
FIG. 7B shows the divided mesh when considering a curvature of a film structure in a fluid-structure coupled numerical simulation method according to an embodiment of the present invention.
Figure 8:
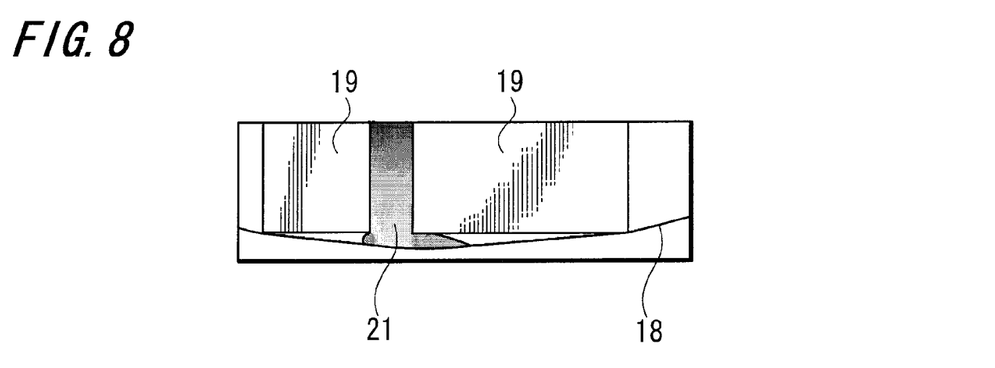
FIG. 8 is a display screen of a coupled boundary surface at the start, showing a computed result of a fluid-structure coupled numerical simulation method according to an embodiment of the present invention.
Figure 9:
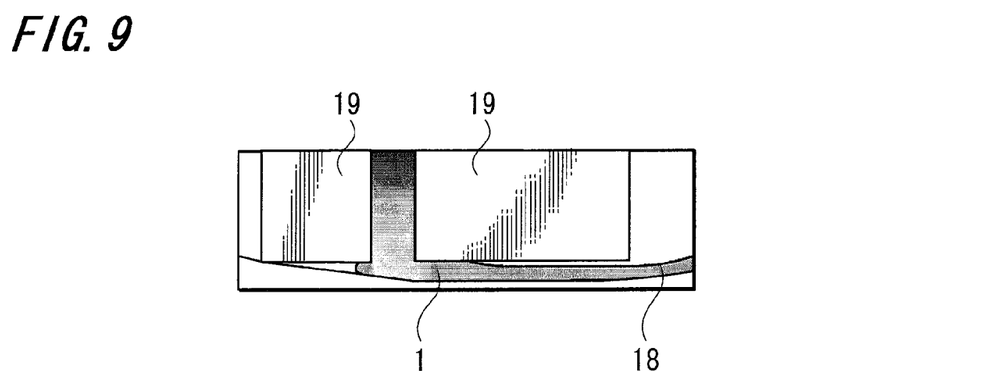
FIG. 9 is a display screen of a coupled boundary surface after a predetermined time has passed, showing a computed result of a fluid-structure coupled numerical simulation method according to an embodiment of the present invention.

A fluid-structure coupled numerical simulation method and a program for a fluid-structure coupled numerical simulation storage device according to embodiments of the preset invention are explained in the followings with reference to FIGS. 3 to 9. FIG. 3 is a schematic view of a running path of a coating device, showing a fluid-structure coupled numerical simulation method according to an embodiment of the present invention. FIG. 4 is a view showing a computational model of the coating device shown in FIG. 3. FIG. 5 is a system diagram showing a computer and memories that implement the fluid-structure coupled numerical simulation according to an embodiment of the present invention. FIG. 6 is a flow chart showing a fluid-structure coupled numerical simulation method according to an embodiment of the present invention. FIG. 7A shows an explanatory view showing divided mesh at the start of computation of a fluid-structure coupled numerical simulation method according to an embodiment of the present invention. FIG. 7B shows an explanatory view showing divided mesh when considering a curvature of a film structure in a fluid-structure coupled numerical simulation method according to an embodiment of the present invention. FIG. 8 shows a display screen of a coupled boundary surface at the start of film moving, showing a computed result. FIG. 9 is a display screen of a coupled boundary surface after a predetermined time has passed, showing a computed result.

Hereinafter, a fluid-structure coupled numerical simulation method according to an embodiment of the present invention is explained with reference to FIGS. 3 to 9. This embodiment is applied to a coating system in which a surface of a film structure is coated with a fluid or the like. A coating device 17 shown in FIG. 3 is a device assumed in this simulation example. A fluid 21 is discharged from an outlet 20 of a nozzle 19 onto a belt-shaped flexible film 18 being fed, and the film 18 is coated with the fluid 21. The film 18 is set to have a predetermined tension between two feeding rollers 22, 23 provided between a feeding reel and a winding reel not shown in the figure.

FIG. 4 shows the initial state of a physical simulation model of the coating device 17 shown in FIG. 3. An area 24 under a line segment connecting the point A to point D in FIG. 4 is defined as a moving object area, where a solid-area surface position inside a computational mesh assumed to be a solid-surface is gradually changed in each computational mesh prepared using a known mesh-preparation processing. A film surface of the film 18 is expressed by interpolating the solid-area surface positions. Further, a boundary condition is set so that the fluid 21 is discharged from the outlet 20 of the nozzle 19. Other than those, tension T by which the film 18 is pulled to the feeding reel side and to the winding reel side and a film feeding velocity V are input as computational conditions.

An initial shape of the film 18 of this coating device 17 has a concave curvature at the point B and point C at both right/left ends of the nozzle 19 in FIG. 4, and so force pushing the film 18 upward in the direction of the nozzle 19 is worked, which presumably affects the shape of the film 18 to enter the nozzle 19. In this regard, if a computer (hereinafter called a CPU) is used to determine whether to make the film 18 and the nozzle 19 in contact or not, this problem is solved, however, typically the load becomes high when the decision of contact/non-contact is implemented during the numerical computation and also simulation may become unstable. Further, in this embodiment, since the film 18 obviously moves in the negative direction of Z axis (minus z-axis direction), a moving range in the computational process is limited by assuming that the film surface of the film 18 does not move in the positive direction of z axis (plus z-axis direction) from the initial state, thereby reducing the computational load in the CPU.

FIG. 5 is a system diagram showing a relation between the CPU and memories for explaining a fluid-structure coupled numerical simulation method according to an embodiment of the present invention, when the surface of a film structure is coated with a fluid. FIG. 5 shows: a host CPU 25 for computational processing of the simulation according to an embodiment of the present invention; an input device 26 such as a mouse, keyboard and the like; a display 27 that displays computational situations and results; memories 28, 29 such as ROM and RAM; and a coating device 17 constituting a fluid-structure body shown in FIG. 3 and to which the coupled numerical simulation is implemented. The host CPU 25 controls the coating device 17, input device 26, display 27 and memories 28, 29 via a bus 30.

FIG. 6 shows computational procedures of the host CPU 25 when simulating the coating device shown in FIGS. 3 and 4. In FIG. 6, at step ST1, initial settings and boundary condition settings and the like are implemented. Regarding the film 18, a film moving computational area of the moving object area 24 shown in FIG. 4, a tension T of the film 18 and a feeding velocity of the film 18 and the like are set.

The mesh division is implemented by the infinite volume method using a known orthogonal mesh, and a solid rate for each mesh and a position of each mesh in the tangent direction that show a flow state of fluid are set at the next step ST2. The settings regarding a position, shape, velocity-boundary in the tangent direction of the film 18 are implemented at step ST3. FIG. 7A shows the state of mesh division at the portion corresponding to the nozzle 19 before the film 18 moving, and shows each computational mesh (computational cell) 31 where each element shown with broken line is computed.

A curvature of the film 18 is computed at step ST4. In this regard, the film 18 in this embodiment is assumed to have no rigidity for bend, and a shift amount of the film surface in each computational time step is computed based on a balance between a repulsive force obtained from a tension and curvature computation of the film 18 and a pressure obtained from a fluid computation in step ST5 mentioned later on. In this regard, assuming that a film surface of the film 18 is represented by a surface of a solid-setting area, a position, shape and shift amount of the film surface of the film 18 are computed by gradually increasing/decreasing the solid-setting area in each computational mesh in accordance with the shift amount of the film 18.

Further, when the film 18 moves in the direction of a normal line of the film surface or moves in one direction dominantly, a balance of force only in that componential direction may be computed to reduce the computational load. Further, in order to stabilize the computation, a position of the moving film 18 may be limited not to exceed the initial position set at the step ST1.

The computation of the fluid 21 is implemented and the pressure balance is computed at step ST5. At the time of the fluid computation in the step ST5, considering the state of feeding the film 18 other than a velocity in the moving direction of the film 18 as the velocity-boundary conditions on the film surface of the film 18, a tangent velocity equivalent to the feeding velocity may be computed in the computational step for each mesh. On implementing the computation of the fluid 21, a fluid pressure in the computational cell 31 of each mesh is computed, thus obtaining a moving velocity in the direction of the normal line of the film surface and a position of the film surface in the next time step from a motion equation $\{m\delta u_z/\delta t = -P_{cell}A\}$. Here, "m" denotes the mass of film, "$u_z$" denotes a moving velocity in the z-axis direction of the film 18, "$P_{cell}$" denotes a fluid pressure in each mesh and "A" denotes the area of a computational cell.

Next, after moving a position of the film surface of the film 18, the film surface after movement and transformation is obtained by interpolation as shown in FIG. 7B. In this state, a velocity equivalent to the feeding velocity of the film is set in the direction of the normal line at the boundary of the surface of the film 18, again the fluid computation is implemented to compute a pressure, and then a film position in the subsequent mesh is computed. It should be noted that a repulsive force of $P'=2\gamma K$ is generated in accordance with tension γ and curvature K of the film 18 in the transformed state of the film 18. Therefore, after computing the curvature of the film 18 in the computational cell 31 of each mesh, only a balance of repulsive force of a component in the z-direction shown in FIG. 7B is considered for simplification among the force that works in the direction of the normal line of the film 18 in this embodiment. In practice, an inclined but vertical component z' shown with broken line in the z-axis direction is selected, and the repulsive force ($P'=2\gamma K$) in each area of the computational cell 31 is added as shown in step ST6 to the aforementioned motion equation, implementing computation using the following equation 1;

[Equation 1]

$$m\delta u_z/\delta t = -P_{cell}A + 2\gamma K_{cell}A \cdot n_z \quad (1)$$

where the "$n_z$" is a unit vector in the direction of z-axis.

After the step ST6, then after (t+Δt) has elapsed, operation goes back to the step ST3 through the step ST7, then the computational processing in each computational cell 31 is repeated from the step ST3 to the step ST7.

A liquid having free surface, gas, compressible fluid, and non-Newtonian fluid in which the transform in a pressure state at an arbitrary point is not proportional to a temporal change rate can be set as a fluid in the aforementioned computation. Further, in order to consider the state where the film surface of the film 18 is pressed by some kind of mechanism or structure, other than the repulsive force by the tension and curvature of the film 18, a pressure on the bottom surface of the film 18 may be designated in advance to be added for computation.

FIGS. 8 and 9 show examples of screen that displays the relation between the nozzle 19 and the film surface of the film 18 after computational results for each computational cell 31 described above are processed. FIG. 8 shows the initial state of t=1, and FIG. 9 shows the state of t=2. The state of curvature of the film 18, flow of the fluid 21 and thickness of coating in each computational cell 31 of the fluid and the like can be seen directly. From the results thereof, using the above-mentioned computational method shown with equation 1, it is confirmed that the computation can be implemented stably in one simplified solver by focusing on the balance between a fluid pressure and a repulsive force obtained from tension and curvature of the film and by assuming that the film surface is the surface of solid area inside the computational mesh. The stable computation can be implemented even in the case where the film 18 is in contact with other structures and even in the case where the transform of the film 18 is considerable. Also, from the results thereof, information on the shape of film, shape of liquid surface, thickness of coating, pressure distribution, flow vector and the like can be obtained. It should be appreciated that an optimal coating condition can be examined at the time of simulation, while changing the tension of the film 18, positions (fixed points) of feeding rollers 22, 23, feeding velocity of the film 18, discharge velocity of the fluid 21 that is a coating liquid, viscosity of the fluid 21, the shape of the discharge nozzle 19 and the like.

Though the initial position of the film 18 in this embodiment is shown with the line segment from point A to point D as shown in FIG. 4, the line segment can also be defined as a curve. When there is provided a mechanism or the like by which the film is pushed upward in the direction of the nozzle 19 at a setting area of the film 18, that effect can be taken into consideration by adding the pressure of that amount to the right side of the equation 1. In this embodiment, assuming that the film 18 does not move in the positive z-axis direction from the initial position, restriction is imposed to obtain high speed computation. However, that restriction can be cancelled or the range of restriction can be narrowed and, for example, a state in which the film 18 is wound into the nozzle 19 can also be computed.

Further, a Newtonian fluid, non-Newtonian fluid in which a viscosity coefficient and a pressure change at an arbitrary point are not proportional to a temporal change rate and a compressible gas can also be set as the fluid 21 to be computed. For simplification, the computation is implemented in this embodiment by focusing only on the z-axis direction among the moving directions of the film 18, however, the computation may be implemented by focusing on the normal line direction of the film surface. By changing such computational settings, an embodiment of the present invention can be applied to the discharge nozzle 19 with complicated shape. Further, not limited to simulation of a liquid-coating process, this computational method can also be applied to simulation analysis of a floating state of a tape caused by an air filter and to the simulation analysis of the tape path in the vicinity of a magnetic head, for example.

It should be understood by those skilled in the art that various modifications, combinations, sub-combinations and alterations may occur depending on design requirements and other factors insofar as they are within the scope of the appended claims or the equivalents thereof.

What is claimed is:

1. A storage medium storing computer readable codes to provide a fluid-structure coupled numerical simulation method using a finite volume method that employs an orthogonal mesh and a computer and memory that set a solid area based on a solid rate inside a computational mesh and at a tangent position to each mesh, comprising the fluid-structure coupled numerical simulation method steps of:

setting initial and boundary conditions of a shape, shift computed area, tension and feeding velocity of a moving film structure;

setting a velocity boundary in a tangent direction of said film structure by computing a position and shape of the film structure;

computing a curvature of said film structure;

computing a pressure balance based on a balance between a pressure obtained from a fluid computation and a repulsive force obtained from the tension of the film structure and curvature thereof computed in said curvature computing step to implement processing of a mutually-coupled phenomenon between said film structure having no rigidity for bend moving in a predetermined direction and a fluid flowing on a film surface of said film structure; and simulating a shift amount of the film surface for each time said fluid-structure coupled numerical simulation method steps is executed.

2. The storage medium of claim 1 wherein the computer readable codes to provide the fluid-structure coupled numerical simulation method further comprise the steps of:

representing the film surface of said film structure by a surface of a solid-setting area portion; and simulating position, shape and velocity of the film structure by gradually increasing or decreasing a solid-setting area portion in each computational mesh in accordance with the shift amount of the film surface.

3. The storage medium of claim 1 wherein the computer readable codes to provide the fluid-structure coupled numerical simulation method, further comprise the step of:

computing said pressure balance only in the component direction to reduce a computational load when said moving direction of said film structure is a normal line direction of said film surface or said moving direction is dominant in one direction.

4. The storage medium of claim 1 wherein the computer readable codes to provide the fluid-structure coupled numerical simulation method, further comprise the step of:

automatically setting, when implementing said fluid computation, a tangent velocity equivalent to the feeding velocity as said velocity boundary condition on said film surface of said film structure for each computational step by considering a feeding state of the film structure other than the velocity in said moving direction.

5. The storage medium of claim 1 wherein the computer readable codes to provide the fluid-structure coupled numerical simulation method, further comprise the step of:

inputting two fixed points of said film structure.

6. The storage medium of claim 1 wherein the computer, readable codes to provide the fluid-structure coupled numerical simulation method, further comprise the step of:

stabilizing computations by restriction to a moving position of said film structure not to exceed an initial setting position.

7. The storage medium of claim 1 wherein the computer readable codes to provide the fluid-structure coupled numerical simulation method, further comprise the step of:

setting a liquid having free surface, a gas, a compressible fluid or a non-Newtonian fluid as said fluid.

8. The storage medium of claim 1 wherein the computer readable codes to provide the fluid-structure coupled numerical simulation method, further comprise the steps of:

determining a surface pressure of said film structure; and applying said surface pressure of said film structure in advance and separately from said repulsive force obtained from said tension and curvature of the film structure.

9. A storage medium comprising computer readable codes to provide a program for a fluid-structure coupled numerical simulation storage device using a finite volume method that employs an orthogonal mesh and a computer and memory that set a solid area based on a solid rate inside a computational mesh and at a tangent position to each mesh, comprising the steps of:

setting initial and boundary conditions of a shape, shift computated area, tension and feeding velocity of a film structure;

setting a velocity boundary in a tangent direction of said film structure by computing a position and shape thereof;

computing a curvature of said film structure;

computing a pressure balance based on a balance between a pressure obtained from a fluid computation and a repulsive force obtained from the tension of the film structure and the curvature thereof computed in said curvature computing step to implement processing of a mutually-coupled phenomenon between said film structure having no rigidity for bend moving in a predetermined direction and a fluid flowing on a film surface of said film structure; and simulating a shift amount of the film surface for each time said computating steps is executed.

10. A data processor configured to provide a fluid-structure coupled numerical simulation method using a finite volume method that employs an orthogonal mesh and a memory that set a solid area based on a solid rate inside a computational mesh and at a tangent position to each mesh, the data processor configured to effect the following steps:

setting initial and boundary conditions of a shape, shift computed area, tension, and feeding velocity of a moving film structure;

setting a velocity boundary in a tangent direction of said film structure by computing a position and shape of the film structure;

computing a curvature of said film structure;

computing a pressure balance based on a balance between a pressure obtained from a fluid computation and a repulsive force obtained from the tension of the film structure and curvature thereof computed in said curvature computing step to implement processing of a mutually-coupled phenomenon between said film structure having no rigidity for bend moving in a predetermined direction and a fluid flowing on a film surface of said film structure; and simulating a shift amount of the film surface each time said fluid-structure coupled numerical simulation method is executed.

11. The data processor according to claim 10, further comprising:

representing the film surface of said film structure by a surface of a solid-setting area portion; and simulating position, shape and velocity of the film structure by gradually increasing or decreasing a solid-setting area portion in each computational mesh in accordance with the shift amount of the film surface.

12. The data processor according to claim 10, further comprising:

computing said pressure balance only in the component direction to reduce a computational load when said moving direction of said film structure is a normal line direction of said film surface or said moving direction is dominant in one direction.

13. The data processor according to claim 11, further comprising:

automatically setting, when implementing said fluid computation, a tangent velocity equivalent to the feeding velocity as said velocity boundary condition on said film surface of said film structure for each computational step by considering a feeding state of the film structure other than the velocity in said moving direction.

14. The data processor according to claim 10, further comprising:

inputting two fixed points of said film structure.

15. The data processor according to claim 10, further comprising:

stabilizing computations by applying a restriction to a moving position of said film structure not to exceed an initial setting position.

16. The data processor according to claim 10, further comprising:

setting a liquid having free surface, a gas, a compressible fluid or a non-Newtonian fluid as said fluid.

17. The data processor according to claim 10, further comprising:

determining a surface pressure of said film structure; and applying said surface pressure of said film structure in advance and separately from said repulsive force obtained from said tension and curvature of the film structure.

* * * * *